March 8, 1966   W. C. AYCOCK ETAL   3,238,717
REUSEABLE ROCKET MOTOR FOR CORRECTING THE ORBITAL PATH
OF A MANNED SPACE VEHICLE Filed Aug. 23, 1963   2 Sheets-Sheet 1

William C. Aycock
William W. Schwarz   INVENTORS

BY *Rob' I Williams*

ATTORNEY

William C. Aycock
William W. Schwarz  INVENTORS

United States Patent Office 3,238,717
Patented Mar. 8, 1966

3,238,717
REUSEABLE ROCKET MOTOR FOR CORRECTING THE ORBITAL PATH OF A MANNED SPACE VEHICLE
William C. Aycock and William W. Schwarz, Huntsville, Ala., assignors to Thiokol Chemical Corporation, Bristol, Pa., a corporation of Delaware
Filed Aug. 23, 1963, Ser. No. 304,125
1 Claim. (Cl. 60—35.6)

This invention relates to improvements in reuseable rocket motors and, more particularly, to rocket motors of the type that can be used to correct the orbital path or orientation of a manned space vehicle.

At the present time, the use of diverting thrusts to control the orbital path of propulsion units has been limited to the use of the exhaust gases of the propulsion motors—liquid or solid. Weight-increasing and complicated actuating mechanisms have been employed to control, by means of valves and other by-pass providing media, the attitude of space vehicles. Use of such controls is limited, however, in solid propellant propulsion systems because of the intense heat that is developed in the exhaust stream of such propulsion systems.

It is an object of this invention, therefore, to provide reuseable rocket motors that, of themselves, do not initially form propulsion units but provide diverting thrusts that will change the orbital path or orientation of manned space vehicles, with such rocket motors adding to the space vehicle a minimum of inert, non-propulsive weight.

Such a rocket motor being so mounted in the wall of the space vehicle that it can be fired by a member of the crew of the space vehicle and will have a removable breech-block mechanism positioned at the head end of the rocket motor case so that separate propellant charges may be loaded into the rocket motor case through the breech-block mechanism and fired as control of the space vehicle is found to be necessary.

Figure 1:
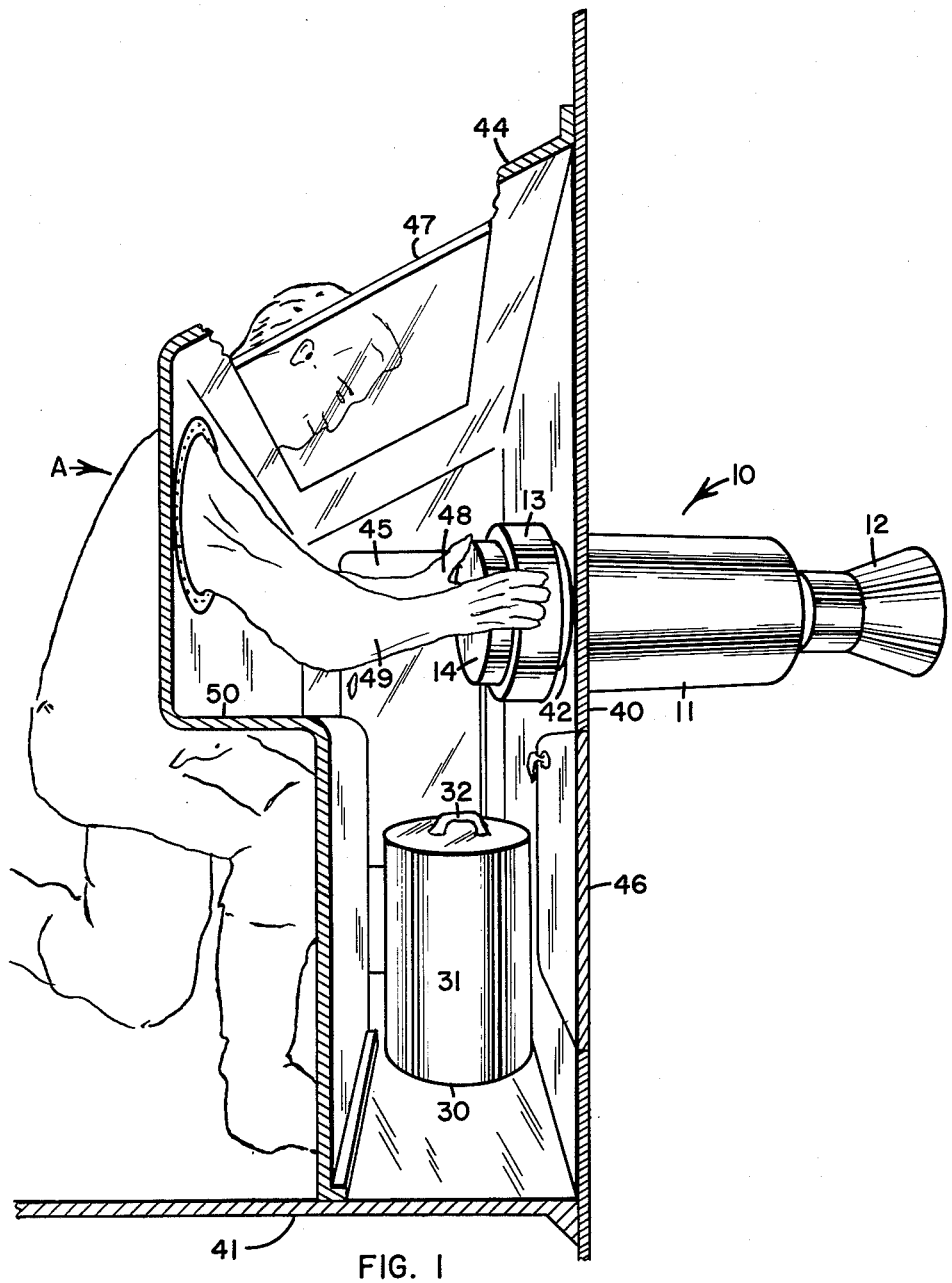
Figure 2:
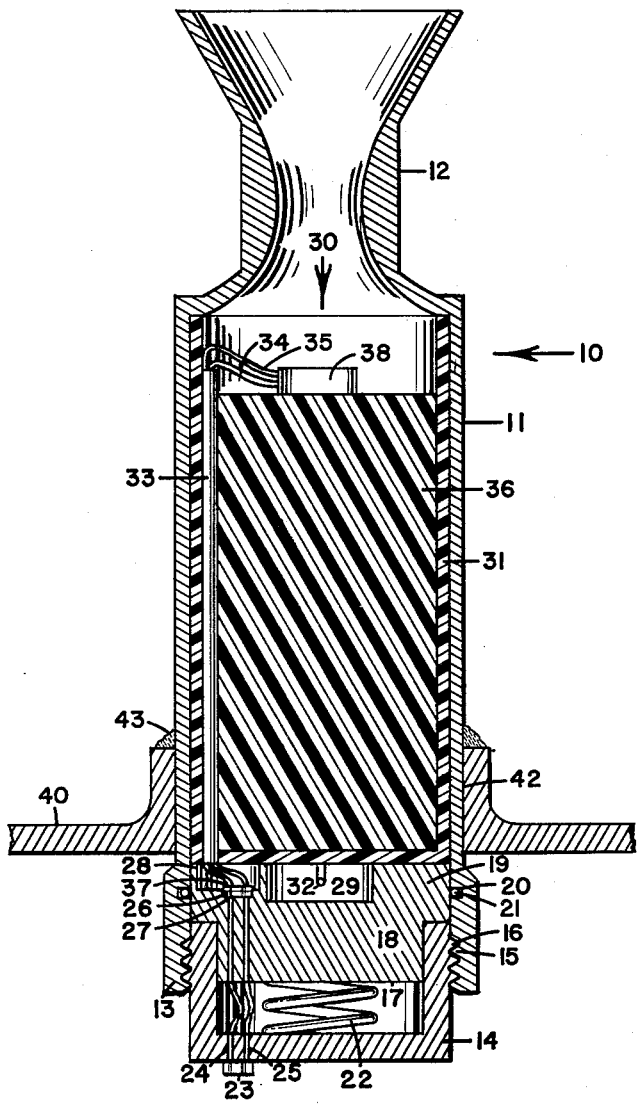

With the above and other objects and advantages in view, the invention consists of the novel details of construction, arrangement, and combination of parts more fully hereinafter described, claimed, and illustrated in the accompanying drawings in which:

FIGURE 1 is a schematic, perspective view showing the manner in which the reuseable rocket motor is mounted in a manned space vehicle, and FIGURE 2 is an enlarged, longitudinal, sectional view of the reuseable rocket motor embodying the invention and showing a fragmentary section of the wall of a space vehicle and a manner of mounting the reuseable rocket motor therein.

Referrding more in detail to the drawings wherein like parts are designated by like reference numerals, the reference numeral 10 is used to generally designate a reuseable rocket motor embodying the invention.

The rocket motor 10 comprises a motor case or pressure vessel manufactured from a suitable rigid material 11 having at the aft end thereof an integral exit cone or nozzle 12. The head end of the motor case 11 is open, and an annular reinforcing flange 13 is provided to strengthen what might be termed the breech of the motor case 11. A cup-shaped breech block 14 is detachably engaged with the head end of the motor case 11 by means of a breech lock which constitutes interengageable threads 15 and 16 which are formed respectively on the exterior of the breech block 14 and the interior of the motor case 11 adjacent to the head end thereof.

A piston or plunger 17 is positioned in the motor case 11 inwardly of the breech block 14; and the piston 17 has a reduced portion 18 that extends into the breech block 14 and an enlarged shoulder portion 19—the external surface of which is slightly less than the internal surface of the motor case 11 so that it will be slidably received within the motor case 11. An annular groove 20 is provided in the internal surface of the motor case 11 at the point of contact with the plunger 17, and a suitable sealing gasket 21 positioned in the groove 20 to prevent leakage of gases past the plunger 17. The plunger 17 is spring-biased inwardly of the open head end of the motor case 11 by means of a suitable spring 22 (a coil spring being shown) that is interposed between the breech block 14 and the head of the plunger 17.

A female electrical connector 23 secured to the outer surface of the breech block 14 has electrical leads 24 and 25 respectively extending therethrough and through the plunger 17 to terminate in a second female connector 26 that is secured in a socket 27 in the bottom surface of a circular cavity 28 in the inner face of the shoulder portion 19 of the plunger 17. The inner face of the shoulder portion 19 also has a circular cavity 29 in the medial portion thereof that is used for a purpose to be later described.

A propellant charge 30 that is to be inserted into the motor case 11 comprises a container 31 having an open fore end and a closed aft end, a handle 32 being provided at the aft end so that the propellant charge 30 can be handled as required. A longitudinally extending raceway 33 molded into the interior surface of the container 31 serves to carry lead wires 34 and 35 respectively approximately longitudinally of the container 31. Solid propellant 36 is cast in a suitable configuration (an end-burning configuration being shown) into the container 31 and then cured in the conventional manner. Lead wires 34 and 35 have a male electrical connector 37 connected to one of their ends; and the male electrical connector 37 is connected to the female electrical connector 26 and the opposite ends of the lead wires 34 and 35 are connected to an igniter 38 that is adhesively secured to the burning ends of the solid propellant 36.

In FIGURE 1, the manner of mounting the rocket motor 10 for operational use is shown; and the reference numeral 40 designates a portion of the outer wall or skin of a space vehicle and 41 designates other structure. The wall 40 has a flanged opening 42 therein in which the rocket motor 10 is mounted and retained in place as shown by welding as at 43; or the rocket motor 10 may be mounted so that the thrust thereof may be suitably directed to achieve the necessary thrust alignment. An evacuated glove box 44 is built in the space vehicle about the head end of the rocket motor 10, and the glove box 44 is provided with an air-lock door 45 whereby a propellant charge 40 may be placed in the glove box 44. The wall 40 of the space vehicle is also provided within the area of the glove box 44 with a disposal hatch 46 whereby the container 31 may be disposed of outwardly of the space vehicle after the solid propellant 36 has been consumed. The glove box 44 is also provided with a viewing window 47 and the usual handling gloves 48 and 49 respectively.

In preparing the rocket motor 10 for operation, the solid propellant 36 is cast into the container 31. After the curing and finishing operations of the propellant 36 have been completed, the lead wires 34 and 35 are extended through the raceway 33 and the male connector 37 is connected to the ends thereof that extend outwardly of the aft end of the raceway 33. The opposite ends of the lead wires 34 and 35 are left free to be attached to the igniter 38 when the rocket motor 10 is to be ignited. The propellant charge 30 is now ready to be placed aboard the space vehicle in the glove box 44. The igniter 38 is also placed in the glove box 44, and the glove box 44 is evacuated.

When it is desired to ready the rocket motor 10 for firing, the operator A places his hands and arms in the handling gloves 48 and 49 as shown in FIGURE 1 and places the igniter 38 in contact with the firing surface of the solid propellant 36. A conventional contact adhesive or tape applied to the igniter 38 will retain it in position. By twisting the breech block 14, the threads 15 and 16 are disengaged and the breech block 14 is removed from the motor case 11 as is the plunger 17. The breech block 14 and plunger 17 are then placed on the shelf 50 in the glove box 44; and by grasping the handle 32 of the propellant charge 30, the operator A is able to lift the propellant charge 30 and place it in the motor case 11 through the now open head end thereof.

The propellant charge is not moved into the position shown in FIGURE 1 until the male connector 37 has been connected to the female connector 26; then the plunger 17 and breech block 14 are inserted into the head end of the motor case 11. The handle 32 is received within the cavity 29, and the plunger 17 is in full contact with the aft end of the propellant charge 30. The threads 15 and 16 are arranged so that only a quarter turn of the breech block 14 is required to secure it in operational position. The plunger 17, by reason of the spring 22 will urge the propellant charge 30 into the motor case 11 until it reaches the position shown in FIGURE 1 when it is now in contact with the inner rim of the nozzle 12. The spring 22 compensates for any variation in the length of the container 31 and also holds the propellant charge firmly in place.

Suitable electrical connectors to a suitable electrical circuit within the space vehicle, not shown, are provided in the glove box 44; and such connectors are then engaged with the female electrical connector 23 to complete the electrical circuit to the igniter 38. The rocket motor 10 is now ready for firing when the igniter 38 is energized by means of a suitable switch, not shown, in the electrical circuit being used.

After the rocket motor 10 has been fired and sufficient time has been allowed for the motor case 11 to cool, the breech block 14 and plunger 17 are removed, as previously described. The female and male connectors 26 and 37 are disconnected, and the now empty container 31 is removed from the motor case 11 and disposed of through the hatch 46. A new propellant charge 30 is positioned in the glove box 44 through the door 45 and the rocket motor 10 is then readied for firing, as previously described.

The glove box 44 thus provides a convenient means of handling the operation without loss of pressure within the space vehicle and also allows the operator A to perform the necessary operation without having to enter an air lock for such operation.

The reuseable rocket motor 10 provides a system where only the propellant charge 30 and igniter 38 have to be duplicated for its successful operation, thereby providing an economical system that will provide pre-measured increments of thrust as required to correct the orbital path of a space vehicle.

It is believed that, from the foregoing description, the construction and manner of operation of the invention will be clear to those skilled in the art; and it is to be understood that changes may be made in the arrangement of parts thereof providing such changes fall within the spirit of the invention and the scope of the appended claim.

Having thus described the invention, what is claimed as new and desired to be secured by Letters Patent is:

A reuseable rocket motor for use in correcting the orbital path or orientation of a space vehicle comprising a motor case having an integral nozzle at the aft end thereof and an internally threaded annular reinforcing flange at the head end thereof, a propellant charge comprising a light-weight container having an open aft end and a closed head end having an externally-positioned handle thereon, a solid propellant in said container having an igniter mounted on an exposed surface thereof adjacent the aft end of said motor case, a raceway in said solid propellant, electrical leads extended through said raceway and connected to said igniter for the energizing thereof, a plunger having an enlarged exterior annular shoulder thereon positioned in said motor case in contact with the head end of said container, said plunger having a circular cavity therein to receive the handle on said container, sealing means for said plunger and said motor case, a cup-shaped breech block receivable in the open head end of said motor case in contact with the enlarged shoulder of said plunger and having external threads thereon that are engageable with the internal threads of the annular flange on the head end of said motor case, a spring positioned within said breech block and engaging said plunger to retain said propellant charge in immobile relation to said motor case and electrical leads extended through said breech block and said plunger to be connected to the electrical leads in the raceway in said solid propellant.

References Cited by the Examiner

UNITED STATES PATENTS

| | | | |
|---|---|---|---|
| 1,191,299 | 7/1916 | Goddard. | |
| 2,096,619 | 10/1937 | Prince. | |
| 2,172,163 | 9/1939 | Glowka | 60—35.6 |
| 2,479,828 | 8/1949 | Geckler | 60—35.6 |
| 2,539,404 | 1/1951 | Crutchfield et al. | 60—35.6 |
| 2,713,768 | 7/1955 | Livingston et al. | 60—35.6 |
| 2,979,896 | 4/1961 | Perkins et al. | 60—39.47 |
| 2,998,704 | 9/1961 | Brazil et al. | 60—35.6 |
| 3,069,844 | 12/1962 | Bearer | 60—35.6 |
| 3,144,829 | 8/1964 | Fox | 60—35.6 X |

MARK NEWMAN, *Primary Examiner.*

CARLTON R. CROYLE, *Examiner.*